US011488260B2

(12) United States Patent
Biorge

(10) Patent No.: US 11,488,260 B2
(45) Date of Patent: Nov. 1, 2022

(54) METHOD AND SYSTEM FOR CONSOLIDATING AND ECONOMISING TRANSACTIONS

(71) Applicant: SAYVES LLC, Centerville, UT (US)

(72) Inventor: James Biorge, Centerville, UT (US)

(73) Assignee: SAYVES LLC, Centerville, UT (US)

( * ) Notice: Subject to any disclaimer, the term of this patent is extended or adjusted under 35 U.S.C. 154(b) by 89 days.

(21) Appl. No.: 17/102,040

(22) Filed: Nov. 23, 2020

(65) Prior Publication Data

US 2022/0164872 A1    May 26, 2022

(51) Int. Cl.
| | | |
|---|---|---|
| *G06Q 40/00* | (2012.01) | |
| *G06Q 40/02* | (2012.01) | |
| *G06Q 40/04* | (2012.01) | |
| *G06Q 20/02* | (2012.01) | |
| *G06F 16/22* | (2019.01) | |
| G06Q 50/26 | (2012.01) | |

(52) U.S. Cl.
CPC ............ *G06Q 40/12* (2013.12); *G06F 16/22* (2019.01); *G06Q 20/023* (2013.01); *G06Q 40/025* (2013.01); *G06Q 40/04* (2013.01); G06Q 50/26 (2013.01)

(58) Field of Classification Search
None
See application file for complete search history.

(56) References Cited

U.S. PATENT DOCUMENTS

| 5,848,400 | A | * | 12/1998 | Chang | ................ | G06Q 30/0613 |
|---|---|---|---|---|---|---|
| | | | | | | 705/40 |
| 8,380,621 | B1 | * | 2/2013 | Bent | ...................... | G06Q 40/02 |
| | | | | | | 705/40 |
| 2004/0153398 | A1 | * | 8/2004 | Baumgartner | ......... | G06Q 20/04 |
| | | | | | | 705/39 |
| 2007/0043666 | A1 | * | 2/2007 | Burdette | ................ | G06Q 40/02 |
| | | | | | | 705/42 |

OTHER PUBLICATIONS

Ingber, J. F. (2017). The Development of the Government Securities Clearing Corporation. Economic Policy Review—Federal Reserve Bank of New York, 23(2), 33-50,III. Retrieved from https://dialog.proquest.com/professional/docview/2070379104?accountid=131444 on Sep. 9, 2022 (Year: 2017).*

* cited by examiner

*Primary Examiner* — Kito R Robinson
(74) *Attorney, Agent, or Firm* — Stoel Rives LLP

(57) ABSTRACT

Systems (and associated methods) for reducing a number of asset transfers between holdings institutions in order to balance accounts are disclosed herein. Such systems may include one or more data centers; a hierarchy of processors comprising at least a level one level having a plurality of level one processors and a level two level having one or more level two processors, each level one processor in the hierarchy in communication with a level two processor in the hierarchy; and a plurality of holdings institutions each in communication with a first level one processor of the plurality of level one processors, each of the plurality of holdings institutions having one or more accounts comprising assets. The holdings institutions, the processors, and the data centers may each perform balancing determinations at their level in the system upon receipt of a report of one or more to balancing determinations made by lower level entities in the system. The data center may instruct one or more other elements of the system in the actual transfer of assets according to such balancing determinations.

32 Claims, 9 Drawing Sheets

METHOD AND SYSTEM FOR CONSOLIDATING AND ECONOMISING TRANSACTIONS

BACKGROUND

Assets are often transferred between accounts of holdings institutions. The use of individual transfers of assets (corresponding to each transaction between any two accounts of such holdings institutions) can result in millions of such transfers worldwide each day.

TECHNICAL FIELD

This application relates to the technical field of electronic asset transfers. Specifically, this application relates to reducing a number of asset transfers between holdings institutions in order to minimize the time and expense of each transfer.

DETAILED DESCRIPTION

Figure 1:
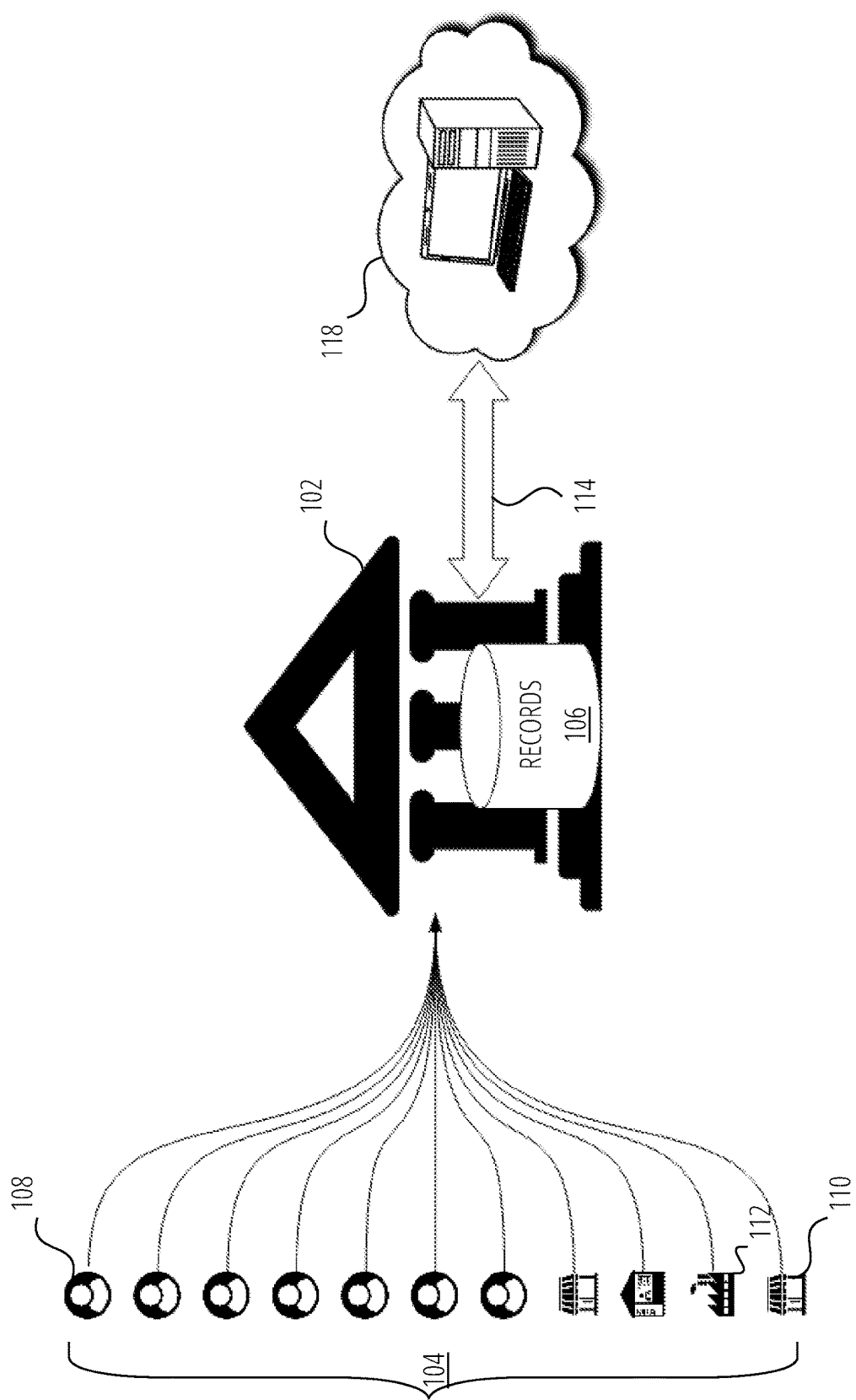
FIG. 1 illustrates the use of the systems and methods disclosed herein from the perspective of a holdings institution having a plurality of accounts, according to an embodiment.

In today's world of commerce, billions of people, businesses, and governments financially interact with other people, businesses, and governments resulting in thousands of financial institutions completing billions of transactions to move trillions of dollars around the world each day. "Holdings institution" when used in this document may refer to all financial institutions that retain or distribute money between multiple entities (e.g., a bank).

Business to Consumer (B2C) transactions including small business transactions are primarily processed by individuals using bank, gift, and loyalty cards, electronic wallets, or other electronic payment methods, interacting with a payment acceptance device that communicates with gateways, third party processors, crypto processors, card associations, and other payment facilitators, usually coordinating with one or more of an issuing bank and acquiring bank.

B2C has a second or mirrored component employing a variety of methods that, like Business to Business (B2B) transactions, actually transfer the money from the bank of the first party to the bank of the second party. The transfer of the money is mostly completed by Fedwire, Clearing House Interbank Payment Systems (CHIPS), Society for Worldwide Interbank Financial Telecommunication (SWIFT), or an Automated Clearing House (ACH) that verifies the amounts to be transferred and the parties sending and receiving the money and then enables, facilitates, or transfers the money as agreed.

Systems and methods disclosed herein contemplate receiving the data regarding the above transactions from multiple additional electronic devices and consolidating the loyalty, gift and payment transactions into one net transaction and then consolidating these net transactions by, for example, bank, regions, centers, and global transactions in a more efficient and effective manner. All transactions may be fully auditable—in other words, all of the data is recorded and tracked digitally to ensure compliance with all national and international banking and security compliance regulations.

Systems and methods disclosed herein contemplate that although each transaction must be accounted for digitally on an individual basis, the actual transfer of the funds out of, for example, bank 1 to bank 2 and then back from bank 2 to bank 1 costs time and money. Accordingly, in processing millions of transactions each day, there is much redundancy, crossing, and/or many back and forth transfers that may be eliminated.

Accordingly, systems and methods disclosed herein contemplate recording (rather than simply performing) the given transactions over a period of time (e.g., a day, or an hour) and performing a net settlement of all transactions in the system at the end of the given time period. The system may include one or more holdings institutions (e.g., banks), which directly hold assets associated with one or more users of the system. The holdings institutions of the system may communicate with a hierarchy of processors and/or one or more data centers in order to perform net settlement across all of the financial institutions participating in the system.

At the end of the given period of time, each holdings institution will end up with three possible end results. First: the holdings institution account holders may have spent as much as they received, resulting in no net change in the assets on deposit (e.g., the funds that would be transferred out would be equal to the funds then transferred back in). Second: the holdings institution account holders may have spent more than they are entitled to receive, resulting in a need for funds to be sent outside the holdings institution. Third: the holdings institution account holders may have spent less than they are entitled to receive, with a result that account holders are owed money and there is a shortage of funds at the holdings institution to meet this deficit, therefore requiring a deposit of assets into the holdings institution to completely balance the accounts. On a global scale, each of these holdings institution shortages and surpluses can be balanced out. Systems and methods disclosed herein minimize the need for an actual transfer of funds transferred between holdings institutions and/or processors communicating with those holdings institutions.

The system may use a hierarchy of processors to optimize and/or minimize the processing of financial transactions. A hierarchy of processors may be split into various levels of processors. An individual processor or level of processors of the hierarchy may be arranged to take advantage of common currencies between processors, exchange rates between processors using different currencies, etc. This may help reducing expenses incurred from transferring money.

Systems and methods disclosed herein may record all transactions between accounts individually (whether or not those accounts are of the same or of different holdings institutions), recording all credits to be received at all accounts and all debits to be taken from all accounts. At the end of the given period, the systems and methods disclosed herein may balance all accounts within a single holdings institution by first using the assets held in that holdings institution and by offsetting the debits associated with accounts at that holdings institution with credits associated with accounts at that holdings institution. In the event there are any surplus or shortages at the holdings institution level, then a net institution balance amount will be sent to an associated level one processor (e.g., a regional processor), to be reconciled with a single request and completed transaction.

Moving up a level, a level one processor (which may be, e.g., a regional processor), may optimize and minimize the amounts to be exchanged between the holdings institution described above and one or more other holdings institutions which may also communicate with the level one processor in the manner described above. This is accomplished by applying the surplus of one holdings institution to offset the shortage of another holdings institution and so to balance all net institution balance amounts, if possible, within the level one processor itself. In the event there are any surplus or shortages then the net level one balance amount will be sent to the next higher level to be reconciled.

Moving up a level, a level two processor (which may be, e.g., a central processor) may receive net level one balance amounts from the level one processor described above and one or more additional level one processors that also communicate with the level two processor in the manner described above. The level two processor may compare the net level one balance amounts from each of these level one processors to determine the most efficient manner to balance all of these net level one balance amounts. The capability to optimize between level one processors is not limited by location or the foreign currency variations. Systems and methods disclosed herein may look beyond countries and currencies to find the most cost effective and efficient way to complete the balancing of accounts to minimize the transfer of funds. If possible, the level two processor will balance all of these net level one balance amounts. For those amounts that cannot be balanced between the level one processors associated with the level two processor, the level two processor may send a net level two balance amount to a level three processor (e.g., a global processor).

A data center (e.g., a global processor) may operate in tandem with other data centers to balance all daily transactions around the world. The data centers may also have access to a data vault where user account information is stored. The level two processors may send any surplus funds to the data center and/or receive any money needed from the data center to balance any remaining level two processor amounts. In some embodiments, any foreign exchange fees that are incurred will be distributed proportionately among the related parties to any foreign transactions.

The preceding description has described a hierarchy of processors having two levels between the holdings institutions and the data center(s) (the level one processors and the level two processors as described). However, it is contemplated that a hierarchy of processors according to embodiments disclosed herein may include one, three, four, five, seven, nine, or any other number of levels as deemed necessary by the user to handle the amount of transactions with which the system will be used.

FIG. 1 illustrates the use of the systems and methods disclosed herein from the perspective of a holdings institution 102 having a plurality of accounts 104, according to an embodiment. Each account 104 of the holdings institution 102 may correspond to user account data stored in a data vault for a user of the systems and methods described herein. Such user account data may include, for example, the transaction key associated with the user, as described below.

A number of transactions corresponding to the accounts 104 of the holdings institution 102 may take place during the designated period described above (e.g., an hour, or a day). During this time, a digital record is kept of each of these transactions in the records 106 of the holdings institution 102 (or alternatively, the records of, e.g., a data center). At the end of the designated time period, the transfers of assets represented by these transactions may be used to settle the various accounts 104 within the holdings institution 102 (as much as possible) and subsequently reduced to a single net institution balance amount (representing the surplus or shortage of assets at the holdings institution 102 after said balancing has occurred). This net institution balance amount may correspond to a transfer 114 of assets to and/or from a level one processor 118 (as needed to finish balancing the accounts 104 of the holdings institution 102).

For example, during a designated time period, a record is made that a customer 108 pays an outside party (e.g., not an account holder at the holdings institution 102) $500. Another record is made that the retailer 110 pays an outside party $2,000. Another record is made that a manufacturer 112 receives $1,000 dollars payment from an outside party. Each of these records is stored in the records 106. In alternative embodiments, the each of these records may be stored alternatively or additionally in a data center. In some cases, each of these transactions may be required to include a session key in order to be considered valid and used in the processes subsequently described. The session key may be generated by a device associated with each of the parties of the transaction, and may be generated by each party entering a known password into the device at the time of the transaction. Each of these records may be generated to include this session key, such that the system may use the session key to generate a transaction key for the actual account stored in a data vault in order to authorize the associated transaction during the designated time period and prior to the time the session key has expired.

At the end of the designated time period, the holdings institution 102 may use the records 106 of each of these transactions to reduce the amount of assets transferred into or outside the holdings institution 102. The holdings institution 102 may look at the $500 debit of the customer 108 and apply it towards the $1,000 credit of the manufacturer 112. The holdings institution 102 may then look at the $2,000 debit of the retailer 110 and use $500 of that debit to finish balancing the remaining $500 of the $1,000 credit transaction of the manufacturer 112. The holdings institution 102 may move assets between the accounts 104 of the customer 108, the manufacturer 112, and the retailer 110 accordingly, and may determine that there is a positive net institution balance amount of $1,500. Each of these transactions may be enabled through using a representation and/or transaction key from user account data that was obtained from a data vault of the system by using a session key associated with each transaction. In other words, the use of such representation/transaction key may have allowed for the transfer of funds into and/or out of an individual account 104 of the holdings institution 102.

The three transactions may be so reduced to one positive net institution balance amount of $1,500 which is communicated to the level one processor 118. Either of the holdings institution 102 and/or the level one processor 118 may then report this to, for example, a data center. In some embodiments, a transfer 114 of assets equaling the net institution balance amount may happen immediately upon the completion of the balancing (to the extent possible, as described above) of all accounts 104 of the holdings institution 102. In some embodiments, the holdings institution 102 may communicate the net institution balance amount to the level one processor 118 and then wait to actually perform the actual transfer 114 of the $1500 in assets to the level one processor 118 until receiving a specific instruction to do so. This instruction may come from the level one processor 118, or it may alternatively come from another entity in the system that can provide such instructions (e.g., a data center, as described below).

Figure 2:
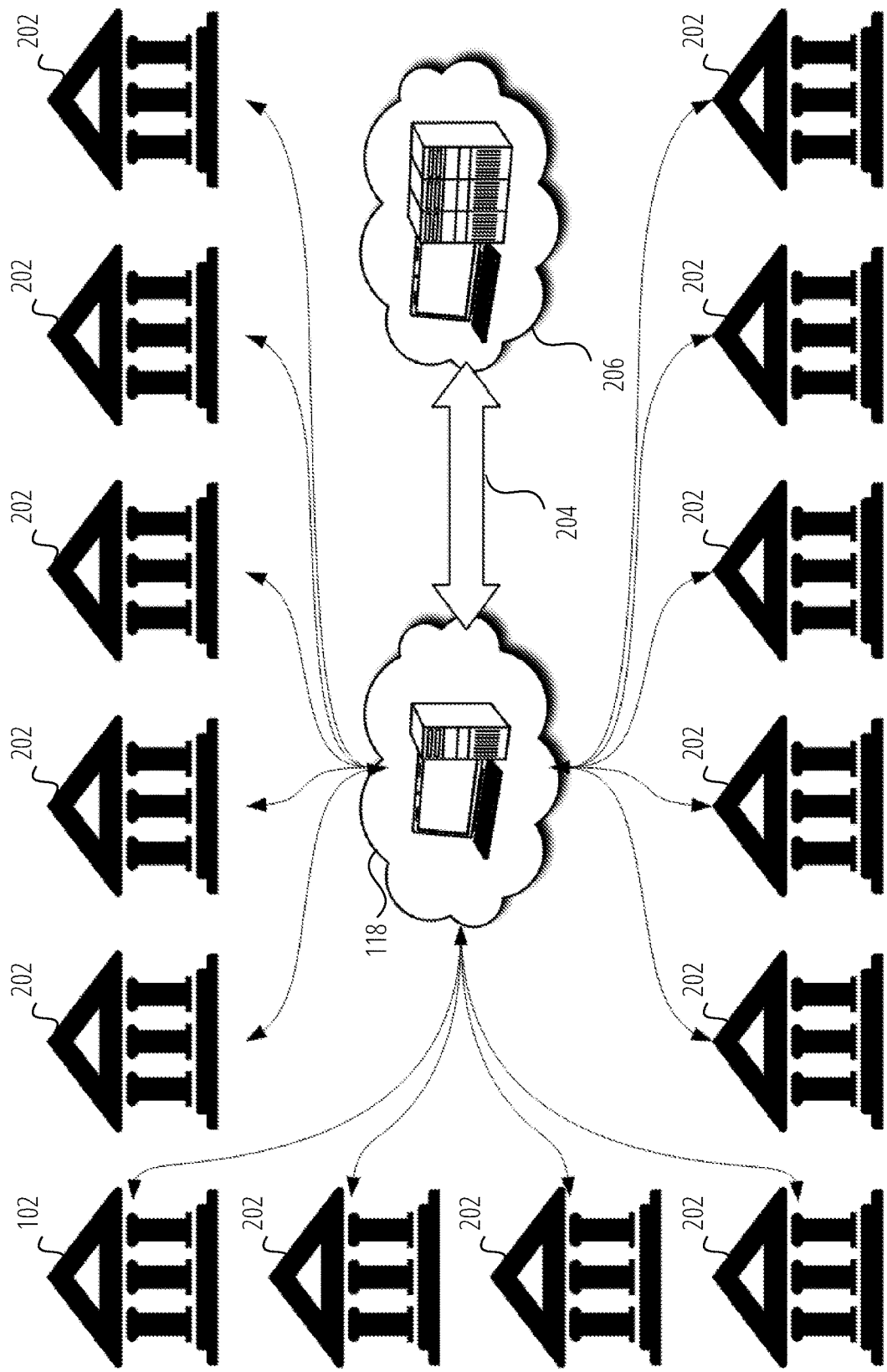
FIG. 2 illustrates the use of the systems and methods disclosed herein from the perspective of a level one processor, according to an embodiment.

FIG. 2 illustrates the use of the systems and methods disclosed herein from the perspective of a level one processor 118, according to an embodiment. The level one processor 118 may be associated with holdings institutions (e.g., the holdings institution 102 and the holdings institutions 202) in a general geographic location. The level one processor 118 may interact with the holdings institution 102 in the manner described in relation to FIG. 1 above.

Further, the level one processor 118 may optimize and minimize the amounts to be exchanged between the holdings institution 102 and one or more other holdings institutions 202 that may also communicate with the level one processor 118. This may be accomplished by applying any surplus of one holdings institution to offset the shortage of another holdings institution and so to balance all net institution balance amounts, if possible, at the level one processor 118 itself. This transfer of assets between holdings institutions (e.g., the holdings institution 102 and the given holdings institution 202 described below) may happen immediately upon receipt of some or all of the necessary assets to balance against a negative net institution balance amount of a first holdings institution from an institution with a positive net institution balance amount. In other cases, the transfer of assets between one or more holdings institutions 101, 202 may occur only after an instruction is received at the one or more holdings institutions 102, 202 and/or the level one processor 118 (from, e.g., a data center).

For example, the holdings institution 102 may have a positive net institution balance amount of $1,500 as described above. However, it may be that one of the holdings institutions 202 reports to the level one processor 118 that it has a negative net institution balance amount of −$500 (because the account holders at that holdings institution 202 are (summed together) entitled to receive $500 more from entities outside the holdings institution 202 than they are obligated to provide (summed together) to entities outside the holdings institution 202). Actual asset transfers directed toward balancing these net institution balance amounts may be performed immediately upon receipt of the $1,500 dollars from the holdings institution 102 by the level one processor 118. In other embodiments, the level one processor 118 may receive the $1,500 in assets from the holdings institution 102 but then wait for an instruction from a data center to then provide some or all of those assets to another holdings institution (e.g., to provide the $500 to the given holdings institution 202). Although this example uses two net institution balance amounts, it is contemplated that any number of net institution balance amounts (from any of the holdings institutions 102, 202) may be balanced in this manner.

The two (or more) net institution balance amounts may be summed together such that one net level one balance amount is generated, which will be sent to the next higher level to be reconciled. In this case, the net institution balance amounts are so reduced to one positive net level one balance amount of $1,000 that is communicated to the level two processor 206. Either of the level one processor 118 and/or the level two processor 206 may report this net level one balance amount to, for example, a data center. In some embodiments, a transfer 204 of assets equaling the net level one balance to the level two processor 206 amount may happen immediately upon the completion of the balancing (to the extent possible, as described above) of all the net institution balance amounts of all the holdings institutions 102, 202. In some embodiments, the level one processor 118 may communicate the net level one amount to the level two processor 206 and then wait to actually perform the actual transfer 204 of the $1,000 in assets to the level two processor 206 until receiving a specific instruction to do so. This instruction may come from the level two processor 206, or it may alternatively come from another entity in the system that can provide such instructions (e.g., a data center, as described below).

Figure 3:
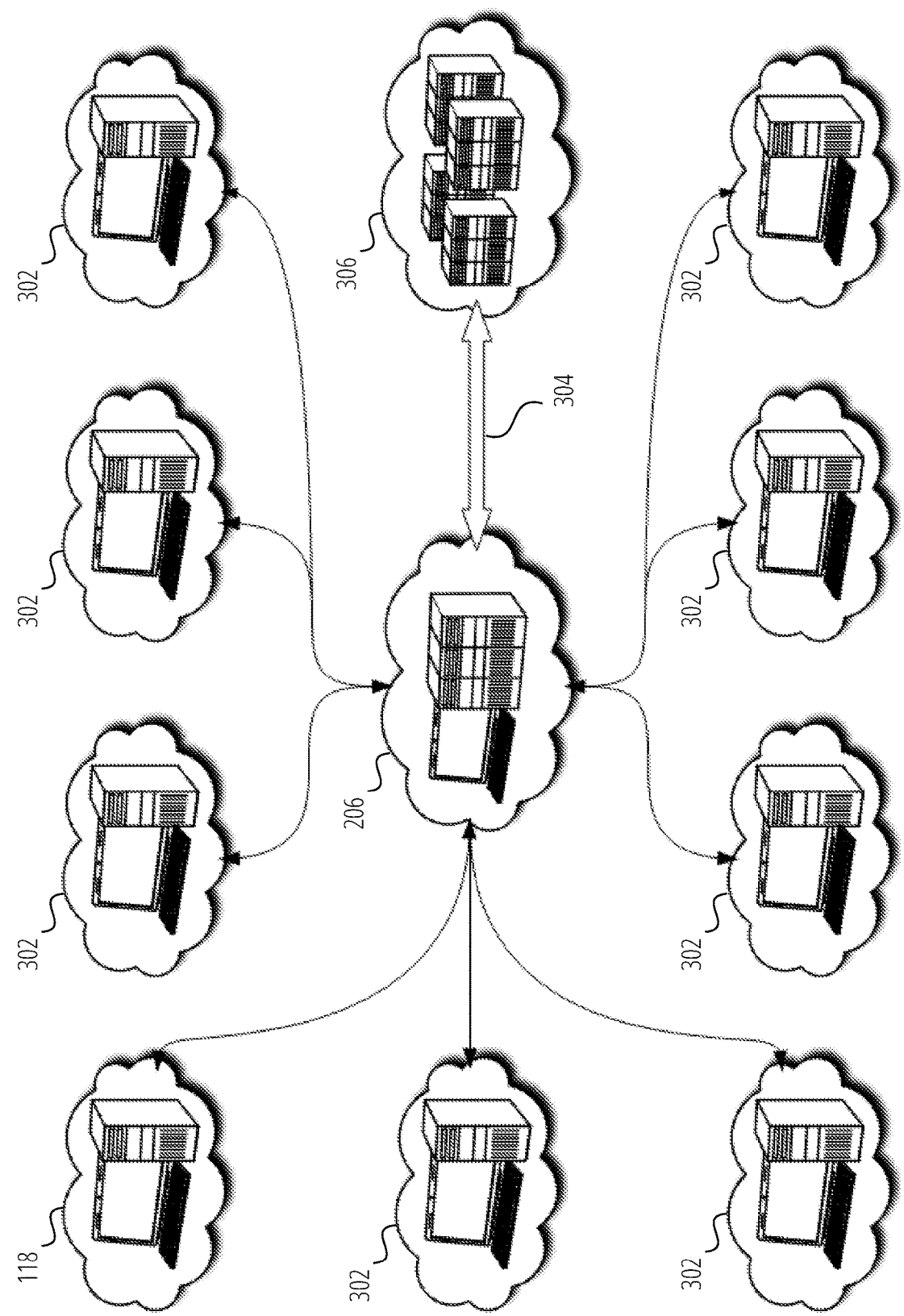
FIG. 3 illustrates the use of the systems and methods disclosed herein from the perspective of a level two processor, according to an embodiment.

FIG. 3 illustrates the use of the systems and methods disclosed herein from the perspective of the level two processor 206, according to an embodiment. The level two processor 206 may be associated with level one processors (e.g., the level one processor 118 and the level one processors 302) in a general geographic location. This geographical location may be larger and/or may encompass (in whole or in part) the geographical region associated with the level one processor 118 described above in relation to FIG. 2. The level two processor 206 may interact with the level one processor 118 in the manner described in relation to FIG. 2 above.

Further, the level two processor 206 may optimize and minimize the amounts to be exchanged between the level one processor 118 and one or more other level one processors 302 that may also communicate with the level two processor 206. This may be accomplished by applying any surplus of one level one processor to offset the shortage of another level one processor and so to balance all net level one balance amounts, if possible, at the level two processor 206 itself. This transfer of assets between level one processors (e.g., the level one processor 118 and the given level one processor 302 described below) may happen immediately upon receipt of the some or all of the necessary assets to balance against a negative net level one balance amount of a first level one processor from a level one processor with a positive net level one balance amount. In other cases, the transfer of assets between one or more level one processors 118, 302 may occur only after an instruction is received at the one or more level one processors 118, 302 and/or the level two processor 206 (from, e.g., a data center).

For example, the level one processor 118 may have a positive net level one balance amount of $1,000 as described above. However, it may be that one of the level one processors 302 reports to the level two processor 206 that it has a negative net level one balance amount of −$4,500 (because the account holders at that holdings institutions structurally beneath the given level one processor 302 are (summed together) entitled to receive $4,500 more from entities outside (e.g., not using a holdings institution structurally beneath) the level one processor 302 than they are obligated to provide (summed together) to entities outside the level one processor 302). Actual asset transfers directed to balancing these net level one balance amounts may be performed immediately upon receipt of the $1,000 from the level one processor 118 by the level two processor 206. In other embodiments, the level two processor 206 may receive the $1,000 in assets from the level one processor 118 but then wait for an instruction from a data center to then provide some or all of those assets to another level one processor (e.g., to provide the $1,000 to the given level one processor 302). Although this example uses two net level one balance amounts, it is contemplated that any number of net institution balance amounts (from any of the level one processors 118, 302) may be balanced in this manner.

The two (or more) net level one balance amounts may be summed together such that a net level two balance amount is generated, which will be sent to the next higher level to be reconciled. In this case, the transaction between the level one processor 118 and the given level one processor 302 is so reduced to a negative −$3,500 net level two balance amount, which is communicated to a data center 306. This may inform the data center 306 that it needs to transfer 204 $3,500 in assets to the level two processor 206 at some point (now or in the future) to complete the balancing at the level two processor 206. In some embodiments, the level two processor 206 may receive the actual transfer 204 of the $3,500 in assets as soon as the data center 306 indicates the transfer 304 (without waiting for further instruction). In other embodiments, the level two processor 206 may wait to actually receive the transfer 204 of the $3,500 in assets from the data center 306 until receiving a specific instruction to do so. This instruction may come from the data center 306.

Figure 4:
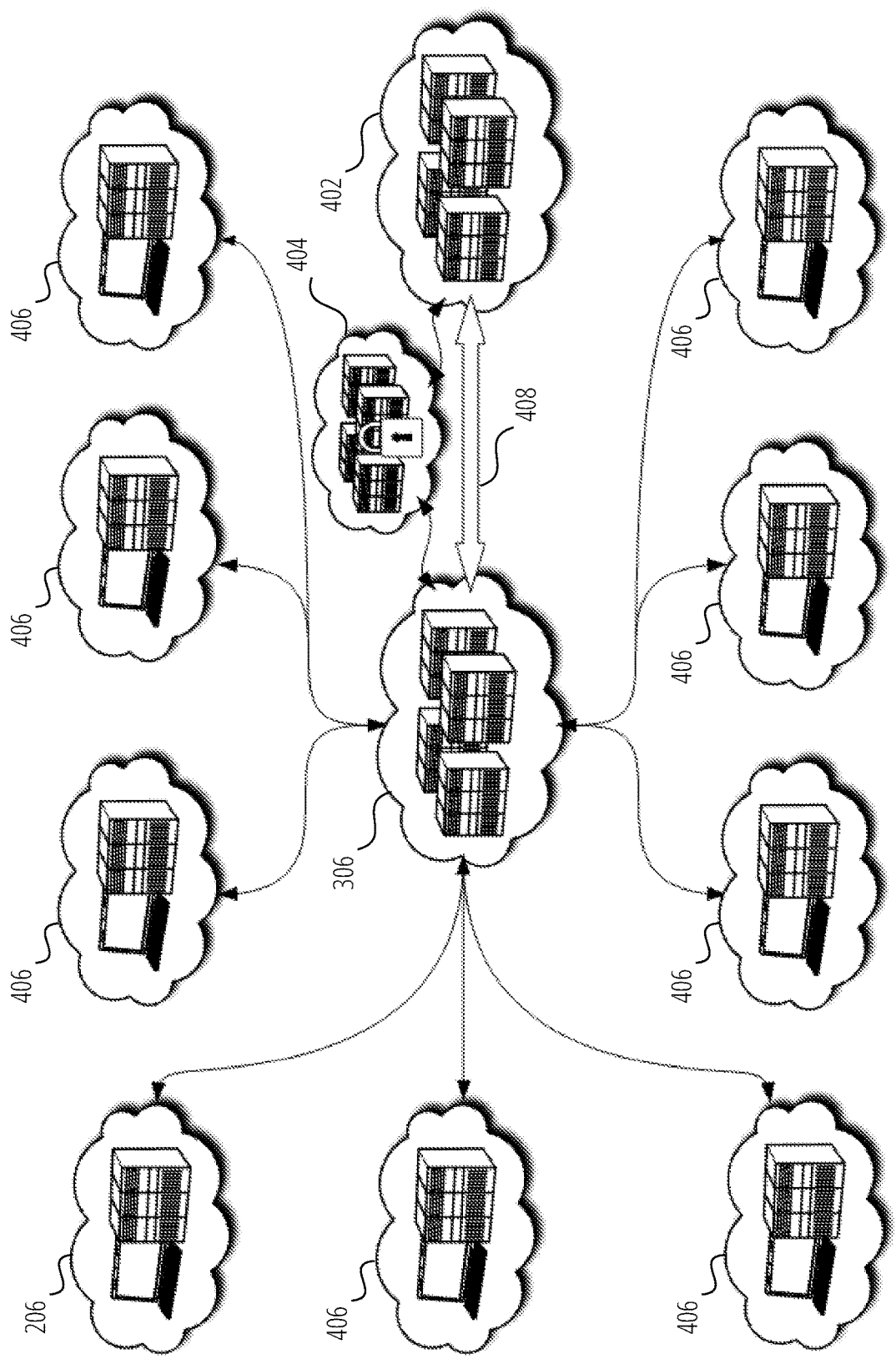
FIG. 4 illustrates the use of the systems and methods disclosed herein from the perspective of a data center, according to an embodiment.

FIG. 4 illustrates the use of the systems and methods disclosed herein from the perspective of the data center 306, according to an embodiment. The data center 306 may be associated with level two processors (e.g., the level two processor 206 and the level two processors 406) in a general geographic location. This geographical location may be larger and/or may encompass (in whole or in part) the geographical region associated with the level two processor 206 described above in relation to FIG. 3. The data center 306 may interact with the level two processor 206 in the manner described in relation to FIG. 3 above.

Further, the data center 306 may optimize and minimize the amounts to be exchanged between the level two processor 206 and one or more other level two processors 406 which may also communicate with the data center 306. This may be accomplished by applying any surplus of one level two processor to offset the shortage of another level two processor and so to balance all net level two balance amounts, if possible, at the data center 306 itself. This transfer of assets between level two processors (e.g., the level two processor 206 and the given level two processor 406 described) may happen immediately upon receipt of the some or all of the necessary assets to balance against a negative net level two balance amount of a first level two processor from a level two processor with a positive net level two balance amount. In other cases, the transfer of assets between one or more level two processors 206, 406 may occur only after an instruction is received at the one or more level two processors 206, 406 from the data center 306.

For example, the level two processor 206 may have a negative net level two balance amount of −$3,500 as described above. However, it may be that one of the level two processors 406 reports to the data center 306 that it has a positive net level two balance amount of $7,500 (because the account holders at the holdings institutions beneath the given level two processor 206 are (summed together) obligated to provide $7,500 more to entities outside (e.g., not using a holdings institution structurally beneath) the level two processor 206 than they are (summed together) entitled to receive from entities outside the level two processor 206). Actual asset transfers directed to this balancing these net level two balance amounts may be performed immediately upon receipt of the $7,500 from the given level two processor 406 by the data center 306. Although this example uses two net level two balance amounts, it is contemplated that any number of net institution balance amounts (from any of the level two processors 206, 406) may be balanced in this manner.

The two (or more) net level two balance amounts may be summed together such that a net data center balance amount is generated. In this case, the transaction between the level two processor 206 and the given level two processor 406 is so reduced to a positive $4,000 net data center balance amount. This may inform the data center 306 that it needs to transfer 408 $4,000 in assets to the one or more other data center(s) (e.g., the data center 402) either now or in the future to so that those other data centers have the assets to balance any negative net data center balance amount(s) they may have.

The data center 306 works together with one or more other data centers (e.g., a data center 402). These other data centers may oversee a subset of holdings institutions and processors of the system in a similar manner as that described in relation to the data center 306. In these cases, it is expected that there may be a surplus or shortage of assets through any one given data center of the plurality of data centers. In the event there are any surpluses or shortages at, for example, the data center 306 after the processes described above, then the data center 306 may work together with other data centers (e.g., the data center 402) to transfer 408 assets between the plurality of data centers such that all data centers can balance all associated net level two balance amounts in the manner described above.

In some embodiments, the data center 306 is the only data center in the system, and it is ultimately oversees all of the holdings institutions and processors of the system. Accordingly, in such a case, there should never be non-zero net data center balance amount for the data center 306.

Regardless of whether there is one or more than one data center, once balance amounts as described herein reach the data center level, a full balance of all balance amounts should be mathematically determinable through the system and executable by sending information and/or assets up from the holdings intuitions through the system and/or instructions and/or assets down from the hierarchy of processors (e.g., the level one processors 116, 302 and the level two processors 206, 406) and/or the one or more data centers of a system (e.g., the data centers 304, 402).

The data center 306 may instruct all system elements structurally beneath itself and/or other data centers as to an actual transfer of assets. For example, while net institution level balance amounts, net level one balance amounts, net level two balance amounts, and/or net data center balance amounts may be communicated immediately upon calculation, the transfer 114, the transfer 204, the transfer 304, and/or the transfer 408 (which actually transfer the assets corresponding to those amounts) may not occur until the data center 306 provides an instruction to make the transfer to the transferring element and/or an instruction to receive the transfer to the receiving element.

The data center 306 may be responsible for reviewing records kept by holdings institutions structurally beneath the data center 306. This may help the data center 306 to be aware of all transactions occurring with its associated holdings institutions, and to ensure the accuracy and necessity of all asset transfers between all elements structurally beneath the data center 306.

The data center 306 may be responsible for instructing a holdings institution structurally beneath the data center 306 in an exchange of assets as between accounts of the holdings institution. It may also be responsible for instructing the holdings institution in an exchange of assets with its associated level one processor. This exchange of assets may be according to the net institution balance amounts exchanged between the holdings institution and the level one processor (as described above), which may have been reported to the data center 306 by the level one processor and/or the holdings institution.

The data center 306 may be responsible for instructing a level one processor structurally beneath the data center 306 in an exchange of assets as between holdings institutions structurally beneath the level one processor. It may also be responsible for instructing the level one processor in an exchange of assets with its associated level two processor. This exchange of assets may be according to the net level one balance amounts exchanged between the level one processor and the level two processor (as described above), which may have been reported to the data center 306 by the level one processor and/or the level two processor.

The data center 306 may be responsible for instructing a level two processor structurally beneath the data center 306 in an exchange of assets as between level one processors structurally beneath the level two processor. It may also be responsible for instructing the level two processor in an exchange of assets with the data center 306. This exchange of assets may be according to the net level two balance amounts exchanged between the level two processor and the data center 306 (as described above).

If other levels of processors exist in the hierarchy of processors, the data center 306 may be responsible for instructing processors at that level (that are structurally beneath the data center 306) in the same fashion.

The data center 306 may order its instructions (e.g., instructions to a holdings institution, instructions to a level one processor, instructions to a level two processor, instructions to another data center, etc.) in such a way that an entity has the needed assets to perform the transfer available. For example, the data center 306 may first instruct a holdings institution to transfer assets to a level one processor so that the level one processor can then perform an instruction from the data center 306 to transfer some or all of those assets to another entity/entities. As another example, the data center 306 may instruct another data center to transfer (e.g., transfer 408) one or more assets to the data center 306 so that the data center 306 can transfer some or all of those assets to another entity/entities.

The data center 306 (and/or any other data centers, e.g., the data center 402) may be in communication with a data vault 404. The data vault 404 may hold information for identifying an account at a holdings institution with a user account of the system (e.g., via a password). The data vault 404 may also hold transaction keys associated with various user accounts of the system that must be accessed and used by, for example, a data center (or another device of the system) to use before it can instruct a holdings institution in the actual transfer of assets out of an account of a holdings institution. A user of the system may need to generate a session key to provide to the system when performing a transaction within the system (in the manner described above), such that a transaction key generated in-lieu-of the user's account in the data vault 404 can be verified using the session key. The transaction key may then be used to authorize the actual transfer of assets corresponding to the transaction out of (or into) an applicable account at a holdings institution.

Figure 5:
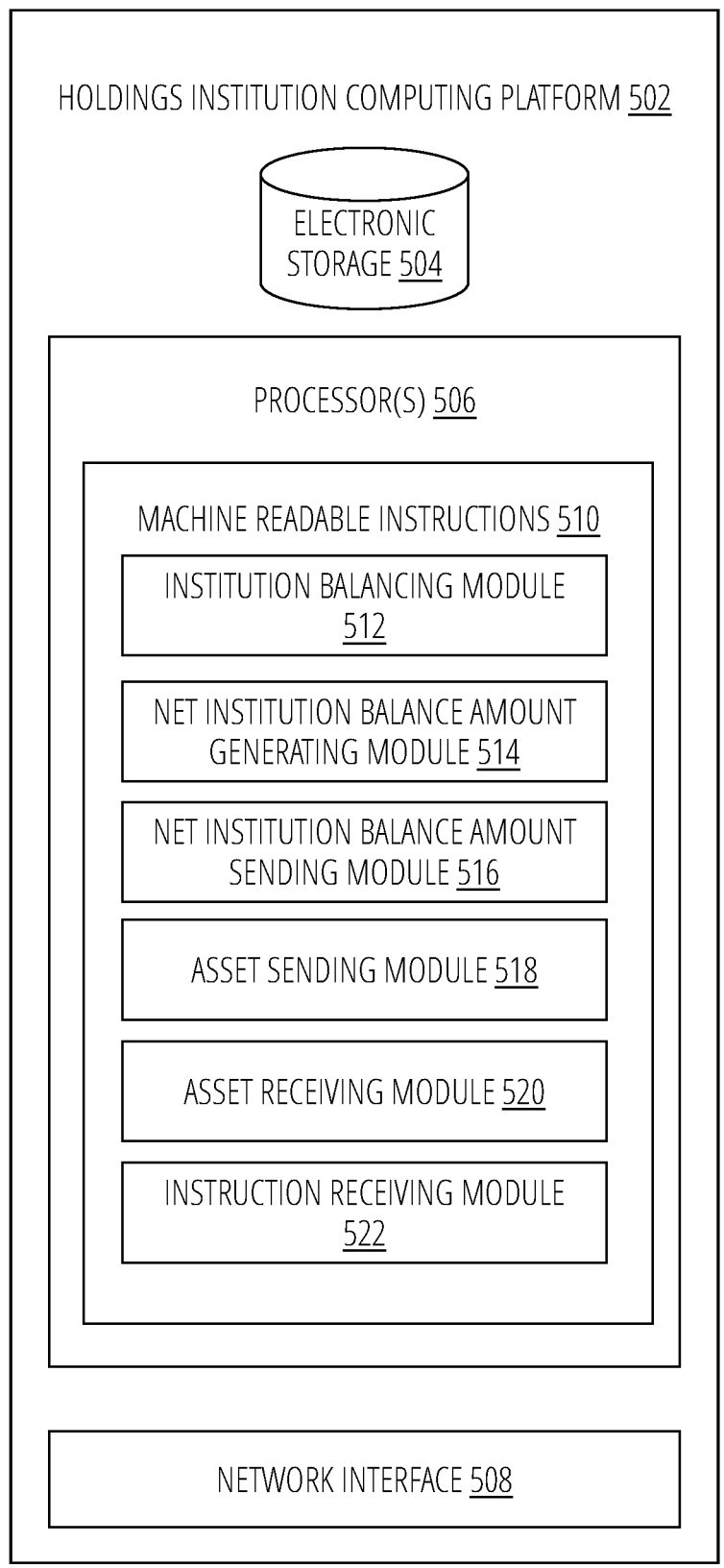
FIG. 5 illustrates a holdings institution computing platform of a holdings institution according to an embodiment.

FIG. 5 illustrates a holdings institution computing platform 502 of a holdings institution according to an embodiment. The holdings institution computing platform 502 may include an electronic storage 504, one or more processor(s) 506, and a network interface 508. The holdings institution computing platform 502 may be included in and/or perform the functions of a holdings institution of the systems described herein.

The holdings institution computing platform 502 may include communication lines, or ports to enable the exchange of information with a network and/or other computing platforms. Illustration of the holdings institution computing platform 502 in FIG. 5 is not intended to be limiting. The holdings institution computing platform 502 may include a plurality of hardware, software, and/or firmware components operating together to provide the functionality attributed herein to the holdings institution computing platform 502. For example, the holdings institution computing platform 502 may be implemented by a cloud of computing platforms operating together as the holdings institution computing platform 502.

The electronic storage 504 may contain data to be used by the processor(s) 506. For example, machine readable instructions 510 of the processor(s) 506 may have been sourced by the processor(s) 506 from the electronic storage 504. The electronic storage 504 may also contain records for accounts managed by the holdings institution that uses the holdings institution computing platform 502 (e.g., the records 106 of FIG. 1 for the holdings institution 102 of FIG. 1).

Electronic storage 504 may comprise non-transitory storage media that electronically stores information. The electronic storage media of electronic storage 504 may include one or both of system storage that is provided integrally (i.e., substantially non-removable) with holdings institution computing platform 502 and/or removable storage that is removably connectable to holdings institution computing platform 502 via, for example, a port (e.g., a USB port, a firewire port, etc.) or a drive (e.g., a disk drive, etc.). The electronic storage 504 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 504 may include one or more virtual storage resources (e.g., cloud storage, a virtual private network, and/or other virtual storage resources). The electronic storage 504 may store software algorithms, information determined by the processor(s) 506, information received from the holdings institution computing platform 502, information received via the network interface 508, and/or other information that enables the holdings institution computing platform 502 to function as described herein.

The processor(s) 506 may include machine readable instructions 510 (which may have been sourced from the electronic storage 504). These machine readable instructions 510 may include instructions for an institution balancing module 512, instructions for a net institution balance amount generating module 514, instructions for a net institution balance amount sending module 516, instructions for an asset sending module 518, instructions for an asset receiving module 520, and instructions for an instruction receiving module 522.

The holdings institution computing platform 502 may include the network interface 508. The network interface 508 may be used by the holdings institution computing platform 502 to communicate with the computing platforms of other elements in the system, such as, for example, a level one processor and/or a data center.

The institution balancing module 512, when implemented by the processor(s) 506, may act to cause the holdings institution computing platform 502 to balance accounts of the holdings institution using assets held in the accounts of the holdings institution (to the extent possible). This may involve reviewing credit and debit transactions for all accounts of the holdings institution and crediting assets from one or more debit transactions against assets from one or more credit transactions. This may further involve performing a full balancing of all accounts of the holdings institution upon the receipt of a transfer of assets from a higher level element corresponding to a negative net institution balance amount of the holdings institution. These balancing actions may require one or more instructions from a data center prior to taking place. Any leftover assets (e.g., in the case where debits exceed credits) may be held by the institution balancing module 512 pending an expected instruction to transfer those assets elsewhere.

It may be that the institution balancing module 512 must first obtain a transaction key from the account relative to one or more transactions made using the account (e.g., from the data center) before it can add and/or remove assets to an account of the holdings institution. The institution balancing module 512 may send the data center the records associated with transactions using the accounts (and/or the session keys associated with such records) to allow the data center to provide it the necessary transaction keys.

The net institution balance amount generating module 514, when implemented by the processor(s) 506 may act to cause the holdings institution computing platform 502 to generate an net institution balance amount. This may involve reviewing credit and debit transactions for all accounts of a holdings institution and calculating a net institution balance amount based on these credits and debits.

The net institution balance amount sending module 516, when implemented by the processor(s) 506 may act to cause the holdings institution computing platform 502 to send a net institution balance amount from the holdings institution computing platform 502 to another device in the system (e.g., a level one processor and/or a data center).

The asset sending module 518, when implemented by the processor(s) 506 may act to cause the holdings institution computing platform 502 to send assets from another device in the system (e.g., a level one processor). This amount may correspond to the amount reflected in a positive net institution balance amount of the holdings institution and held by the institution balancing module 512. This sending of assets may require an instruction received at the instruction receiving module 522 from a data center in order to take place.

The asset receiving module 520, when implemented by the processor(s) 506 may act to cause the holdings institution computing platform 502 to receive assets from another device in the system (e.g., a level one processor). This amount may correspond to the amount reflected in a negative net institution balance amount of the holdings institution. This receipt of assets may require an instruction received at the instruction receiving module 522 from a data center in order to take place.

The instruction receiving module 522, when implemented by the processor(s) 506, may act to cause the holdings institution computing platform 502 to receive instructions from, for example, a data center. These instructions may include an instruction to receive assets from another entity in the system (e.g., a level one processor). These instructions may also include instructions to send assets to another entity in the system (e.g., a level one processor).

Figure 6:
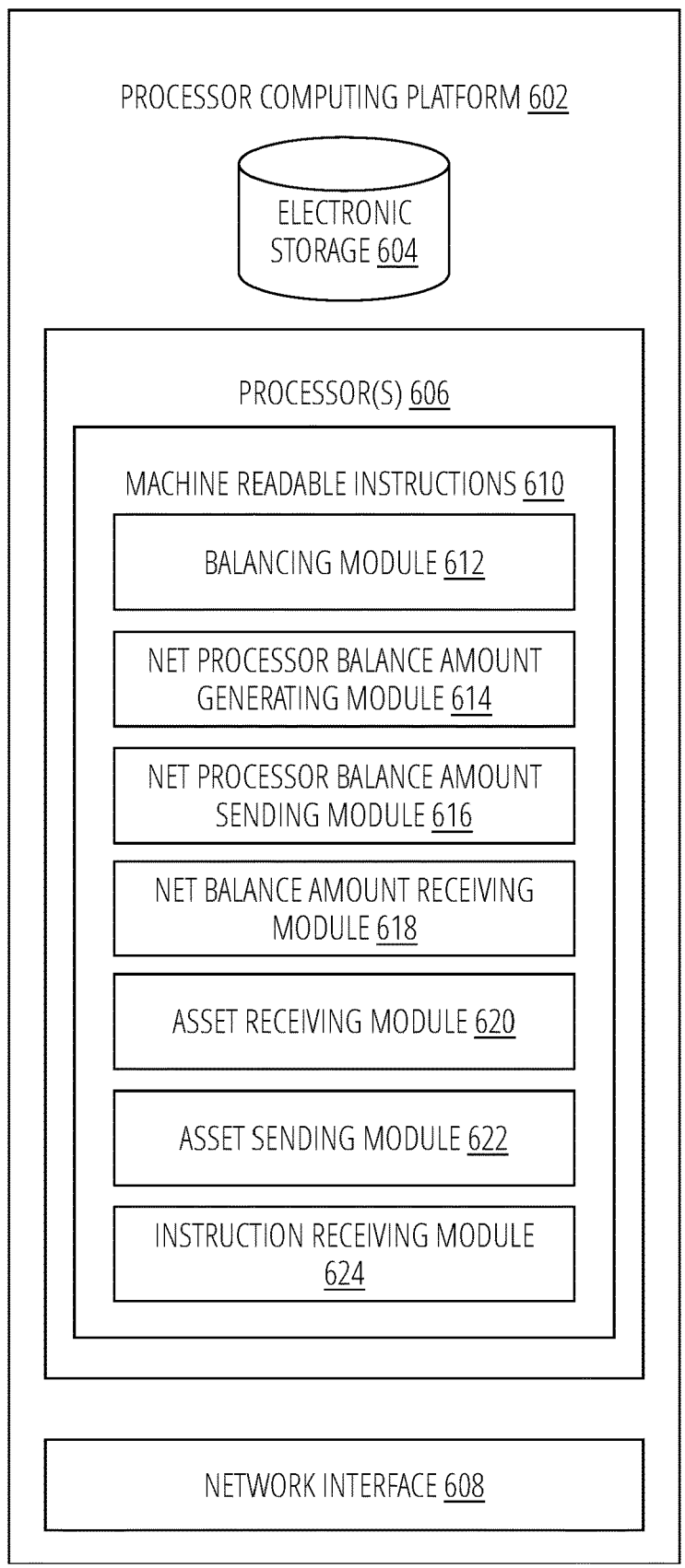
FIG. 6 illustrates a processor computing platform of a processor according to an embodiment.

FIG. 6 illustrates a processor computing platform 602 of a processor according to an embodiment. The processor computing platform 602 may include an electronic storage 604, one or more processor(s) 606, and a network interface 608. The processor computing platform 602 may be included in and/or perform the functions of a processor (e.g., a level one processor, a level two processor, or another level processer) of the systems described herein.

The processor computing platform 602 may include communication lines, or ports to enable the exchange of information with a network and/or other computing platforms. Illustration of the processor computing platform 602 in FIG. 6 is not intended to be limiting. The processor computing platform 602 may include a plurality of hardware, software, and/or firmware components operating together to provide the functionality attributed herein to the processor computing platform 602. For example, the processor computing platform 602 may be implemented by a cloud of computing platforms operating together as the processor computing platform 602.

The electronic storage 604 may contain data to be used by the processor(s) 606. For example, machine readable instructions 610 of the processor(s) 606 may have been sourced by the processor(s) 606 from the electronic storage 604.

The electronic storage 604 may comprise non-transitory storage media that electronically stores information. The electronic storage media of the electronic storage 604 may include one or both of system storage that is provided integrally (i.e., substantially non-removable) with the processor computing platform 602 and/or removable storage that is removably connectable to the processor computing platform 602 via, for example, a port (e.g., a USB port, a firewire port, etc.) or a drive (e.g., a disk drive, etc.). The electronic storage 604 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 604 may include one or more virtual storage resources (e.g., cloud storage, a virtual private network, and/or other virtual storage resources). The electronic storage 604 may store software algorithms, information determined by the processor(s) 606, information received from the processor computing platform 602, information received via the network interface 608, and/or other information that enables the processor computing platform 602 to function as described herein.

The processor(s) 606 may include machine readable instructions 610 (which may have been sourced from the electronic storage 604). These machine readable instructions 610 may include instructions for a balancing module 612, instructions for a net processor balance amount generating module 614, instructions for a net processor balance amount sending module 616, instructions for a net balance amount receiving module 618, instructions for an asset receiving module 620 instructions for an asset sending module 622, and instructions for an instruction receiving module 624.

The processor computing platform 602 may include the network interface 608. The network interface 608 may be used by the processor computing platform 602 to communicate with the computing platforms of other elements in the system, such as, for example, a holdings institution, a processor of a different level, and/or a data center.

The balancing module 612, when implemented by the processor(s) 606, may act to cause the processor computing platform 602 to balance between entities one direct level lower than the processor (e.g., a group of holdings institutions, or a group of lower-level processors) using assets provided to the processor computing platform 602 from those entities (to the extent possible). This may involve reviewing net balance amounts (e.g., net institution balance amounts or net lower level processor balance amounts) for all such entities and crediting assets provided to the processor computing platform 602 corresponding to positive net balance amounts of some such entities against negative net balance amounts of other such entities. This may further involve performing a full balancing of such net balance amounts upon the receipt of a transfer of assets from an higher level element (e.g., a higher level processor and/or a data center) corresponding to a negative net institution balance amount of the processor corresponding to the processor computing platform 602. These balancing actions may require one or more instructions from a data center prior to taking place. Any leftover assets (e.g., in the case where positive net balance amounts exceed negative net balance amounts) may be held by the balancing module 612 pending an expected instruction to transfer those assets elsewhere, as described below.

The net processor balance amount generating module 614, when implemented by the processor(s) 606 may act to cause the processor computing platform 602 to generate a net processor balance amount (e.g., a net level two processor balance amount, in the case where the processor computing platform 602 corresponds to a level two processor). This may involve reviewing all net balance amounts (e.g., net institution balance amounts or net lower level processor balance amounts) for all entities one level lower structurally beneath the processor and generating a net processor balance amount based on those net balance amounts.

In some embodiments, it is anticipated that the net processor balance amount generating module 614 and the net processor balance amount sending module 616 may be used by the processor computing platform 602 to generate and send a net institution balance amount for an institution in the same manner described as, respectively, the net institution balance amount generating module 514 and the net institution balance amount sending module 516 described in relation to FIG. 5. This may be useful in cases where it is desirable to keep as much functionality away from the institution level as possible. This behavior may be facilitated by the receipt of information about accounts of the holdings institution (and information regarding transactions using those accounts) at the network interface 608. This information may come from, for example, the holdings institution and/or a data center. It may also come from, for example, a device of an account holder at the holdings institution that performs the transaction.

The net processor balance amount sending module 616, when implemented by the processor(s) 606 may act to cause the processor computing platform 602 to send a net processor balance amount from the processor computing platform 602 to another device in the system (e.g., a higher level processor and/or a data center).

The net balance amount receiving module 618, when implemented by the processor(s) 606 may act to cause the processor computing platform 602 to receive a net balance amount from an entity one direct level lower than the processor (e.g., a holdings institution and/or a lower level processor).

The asset receiving module 620, when implemented by the processor(s) 606 may act to cause the processor computing platform 602 to send assets to another device in the system (e.g., a higher level processor, or a data center). This amount may correspond to the amount reflected in a positive net processor balance amount of the processor corresponding to the processor computing platform 602. This sending of assets may require an instruction received at the instruction receiving module 624 from a data center in order to take place.

The asset sending module 622, when implemented by the processor(s) 606 may act to cause the processor computing platform 602 to receive assets from another device in the system (e.g., a higher level processor or a data center). This amount may correspond to the amount reflected in a negative net institution balance amount of the processor corresponding to the processor computing platform 602 balancing module 612. This receipt of assets may require an instruction received at the instruction receiving module 624 from a data center in order to take place.

The instruction receiving module 624, when implemented by the processor(s) 606 may act to cause the processor computing platform 602 to receive instructions from, for example, a data center. These instructions may include an instruction to receive assets from another entity in the system (e.g., a higher level processor or a data center). These instruction may also include instructions to send assets to another entity in the system (e.g., a higher level processor or a data center).

Figure 7:
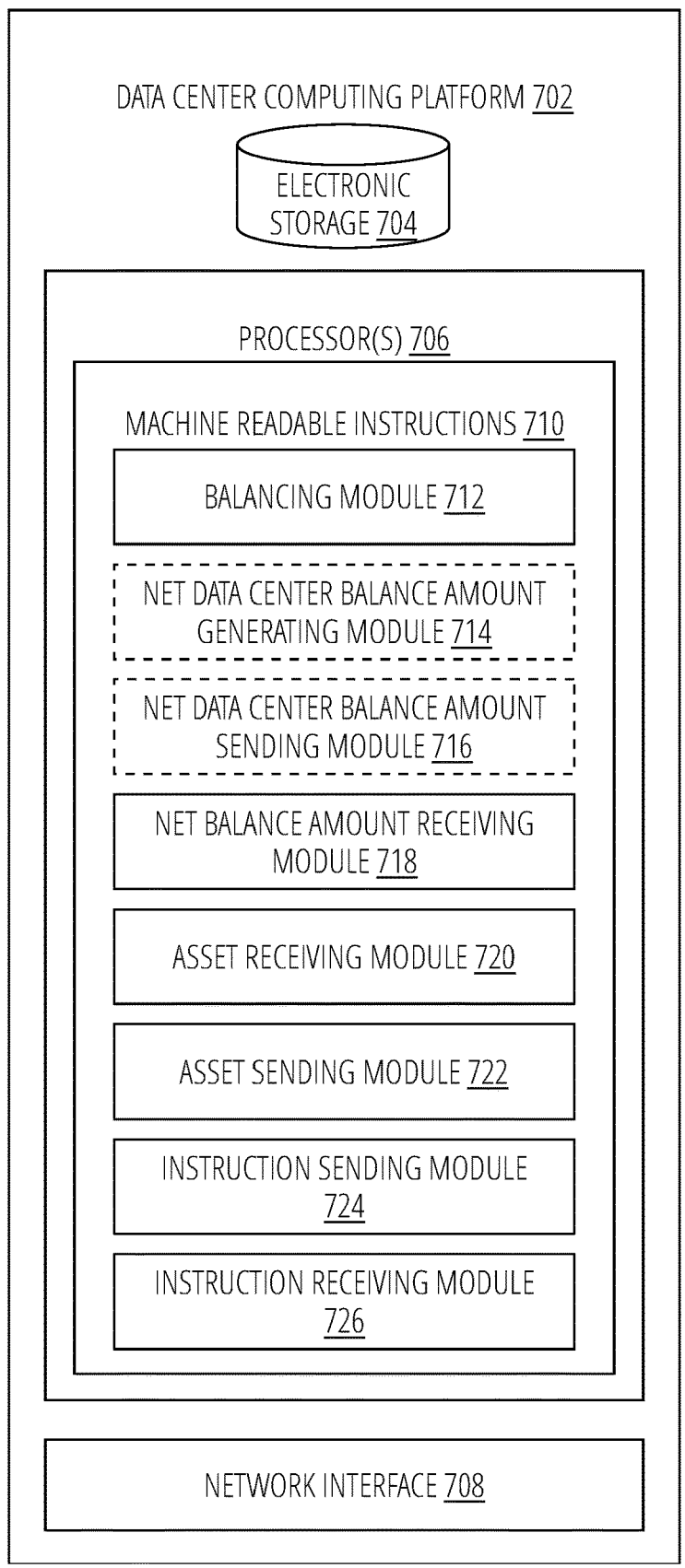
FIG. 7 illustrates a processor data center computing platform of a processor according to an embodiment.

FIG. 7 illustrates a data center computing platform 702 of a processor according to an embodiment. The data center computing platform 702 may include an electronic storage 704, one or processor(s) 706, and a network interface 708. The data center computing platform 702 may be included in and/or perform the functions of a data center of the systems described herein.

The data center computing platform 702 may include communication lines, or ports to enable the exchange of information with a network and/or other computing platforms. Illustration of the data center computing platform 702 in FIG. 6 is not intended to be limiting. The data center computing platform 702 may include a plurality of hardware, software, and/or firmware components operating together to provide the functionality attributed herein to the data center computing platform 702. For example, the data center computing platform 702 may be implemented by a cloud of computing platforms operating together as the data center computing platform 702.

The electronic storage 704 may contain data to be used by the processor(s) 706. For example, machine readable instructions 710 of the processor(s) 706 may have been sourced by the processor(s) 706 from the electronic storage 704.

The electronic storage 704 may comprise non-transitory storage media that electronically stores information. The electronic storage media of the electronic storage 704 may include one or both of system storage that is provided integrally (i.e., substantially non-removable) with the data center computing platform 702 and/or removable storage that is removably connectable to the data center computing platform 702 via, for example, a port (e.g., a USB port, a firewire port, etc.) or a drive (e.g., a disk drive, etc.). The electronic storage 704 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 704 may include one or more virtual storage resources (e.g., cloud storage, a virtual private network, and/or other virtual storage resources). The electronic storage 704 may store software algorithms, information determined by the processor(s) 706, information received from the data center computing platform 702, information received via the network interface 708, and/or other information that enables the data center computing platform 702 to function as described herein.

The processor(s) 706 may include the machine readable instructions 710 (which may have been sourced from the electronic storage 704). These machine readable instructions 710 may include instructions for a balancing module 712, instructions for a net data center balance amount generating module 714, instructions for a net data center balance amount sending module 716, instructions for a net balance amount receiving module 718, instructions for an asset receiving module 720, instructions for an asset sending module 722, instructions for an instruction sending module 724, and/or instructions for an instruction receiving module 726.

The data center computing platform 702 may include the network interface 708. The network interface 708 may be used by the data center computing platform 702 to communicate with the computing platforms of other elements in the system, such as, for example, a holdings institution and/or a processor.

The balancing module 712, when implemented by the processor(s) 706, may act to cause the data center computing platform 702 to balance between the processor one direct level lower than the data center using assets provided to the data center computing platform 702 from those processors (to the extent possible, in cases where there are multiple data centers in the system). This may involve reviewing net processor balance amounts of these processors and crediting assets provided to the data center computing platform 702 corresponding to positive net processor balance amounts against negative net processor balance amounts. This may further involve performing a full balancing of such net processor balance amounts upon the receipt of a transfer of assets from another data center corresponding to a negative net data center balance amount of the data center. Any leftover assets (e.g., in the case where spends exceed receives) may be held by the balancing module 712 pending an expected instruction to transfer those assets elsewhere, as described below.

In embodiments of systems with multiple data centers, the balancing module 712 may also act to balance net data center balance amounts between multiple data centers. Data centers may be trusted systems that can arrange for transfers of assets from each other corresponding to determinations made by the balancing module 712 using net data center balance amounts received from other data centers at the network interface 708.

The net data center balance amount generating module 714, when implemented by the processor(s) 706 may act to cause the data center computing platform 702 to generate a net data center balance amount. This may involve reviewing all net processor balance amounts for all processors one level structurally beneath the data center and generating a net data center balance amount based on those net processor balance amounts.

The net data center balance amount sending module 716, when implemented by the processor(s) 706 may act to cause the data center computing platform 702 to send a net data center balance amount from the data center computing platform 702 to another device in the system (e.g., another data center).

In embodiments of systems disclosed herein that include only a single data center, it may be that the net data center balance amount generating module 714 and the net data center balance amount sending module 716 are not necessary (because a non-zero net data center balance amount may not anticipated in this case).

In some embodiments, it is anticipated that the net data center balance amount generating module 714 and the net data center balance amount sending module 716 may be used by the data center computing platform 702 to generate and send a net institution balance amount for an institution in the same manner described as, respectively, the net institution balance amount generating module 514 and the net institution balance amount sending module 516 described in relation to FIG. 5. This may be useful in cases where it is desirable to keep as much functionality away from the institution level as possible. This behavior may be facilitated by the receipt of information about accounts of the holdings institution (and information regarding transactions using those accounts) at the network interface 708. This information may come from, for example, the holdings institution. It may also come from, for example, a device of an account holder at the holdings institution that performs the transaction.

The net balance amount receiving module 718, when implemented by the processor(s) 706 may act to cause the data center computing platform 702 to receive a net balance amount from an entity that is structurally beneath the data center (e.g., a holdings institution and/or a lower level processor) and/or from another data center.

The asset receiving module 720, when implemented by the processor(s) 706 may act to cause the data center computing platform 702 to receive assets from another device in the system (e.g., another data center). This amount may correspond to some or all of an amount reflected in a negative net data center balance amount of the data center corresponding to the data center computing platform 702. This receipt may require an instruction received at the instruction receiving module 726 from another data center in order to take place.

The asset sending module 722, when implemented by the processor(s) 706 may act to cause the data center computing platform 702 to send assets to another device in the system (e.g., another data center). This amount may correspond to some or all of an amount reflected in a positive net institution balance amount of the processor corresponding to the processor computing platform 602 and held by the balancing module 712. This sending may require an instruction received at the instruction receiving module 624 from another data center in order to take place.

The instruction sending module 724, when implemented by the processor(s) 706 may act to cause the data center computing platform 702 to send instructions to another entity in the system (e.g., a holdings institution, a processor, or another data center). These instructions may include an instruction for such entity to receive assets from either the data center or a third entity of the system. These instructions may also include instructions for the entity to send assets to either a data center or a third entity in the system.

The instruction receiving module 726, when implemented by the processor(s) 706 may act to cause the data center computing platform 702 to receive instructions from another data center. These instructions may include an instruction to receive assets from the other data center. These instructions may also include instructions to send assets to the other data center.

Further, the instruction receiving module 726, when implemented by the processor(s) 706 may act to determine an order in which to issue instructions, such that all entities receiving instructions provided in that order have the needed assets to perform any transfer according to those instructions (as described above).

Figure 8:
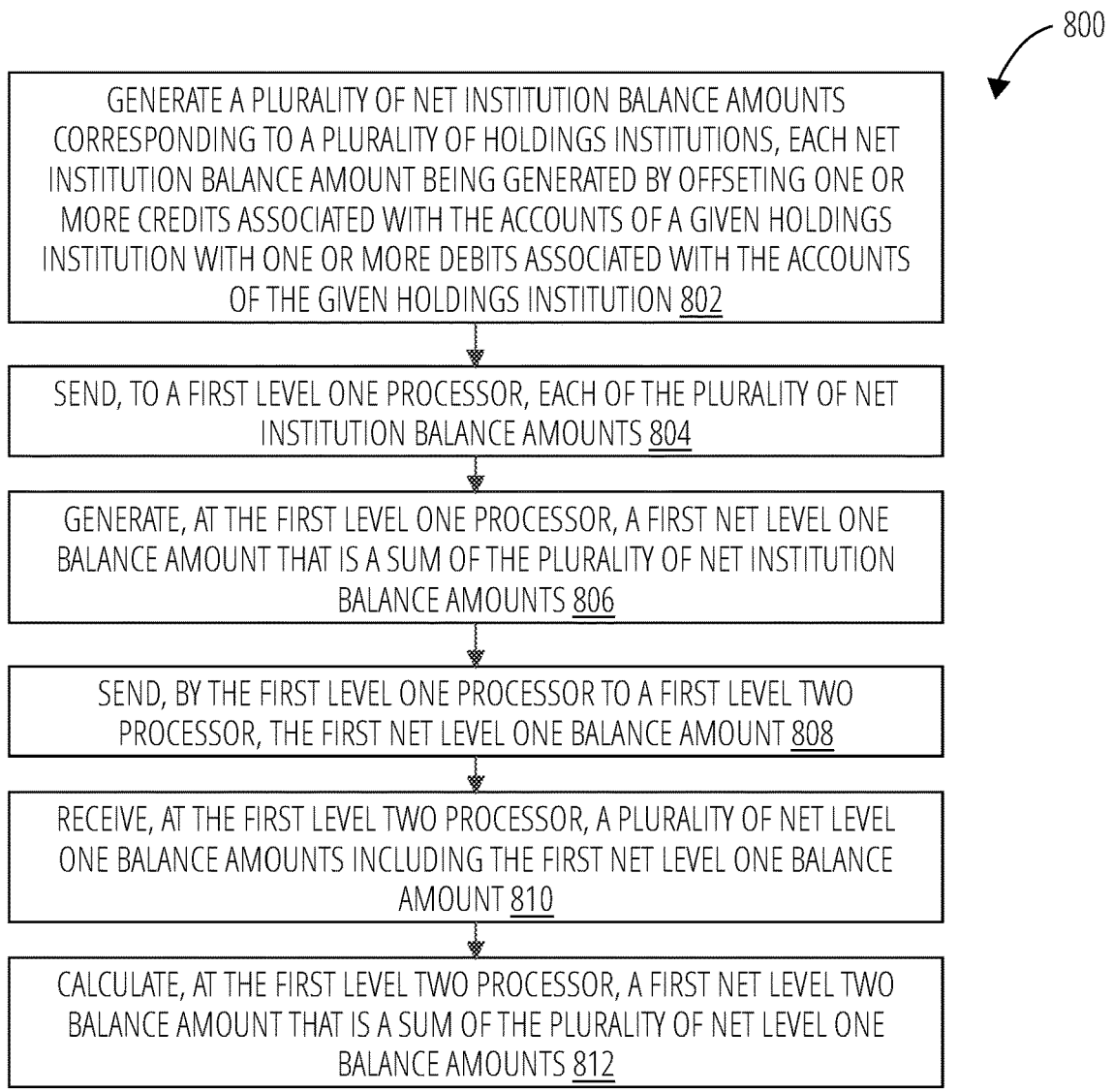
FIG. 8 illustrates a method of a system according to embodiments disclosed herein.

FIG. 8 illustrates a method 800 of a system according to embodiments disclosed herein. The method 800 includes generating 802 a plurality of net institution balance amounts corresponding to a plurality of holdings institutions, each net institution balance amount being generated by offsetting one or more credits associated with the accounts of a given holdings institution with one or more debits associated with the accounts of the given holdings institution.

The method 800 includes sending 804, to a first level one processor, each of the plurality of net institution balance amounts.

The method 800 includes generating 806, at the first level one processor, a first net level one balance amount that is a sum of the plurality of net institution balance amounts.

The method 800 includes sending 808, by the first level one processor to a first level two processor, the first net level one balance amount.

The method 800 includes receiving 810, at the first level two processor, a plurality of net level one balance amounts including the first net level one balance amount.

The method 800 includes calculating 812, at the first level two processor, a first net level two balance amount that is a sum of the plurality of net level one balance amounts.

Figure 9:
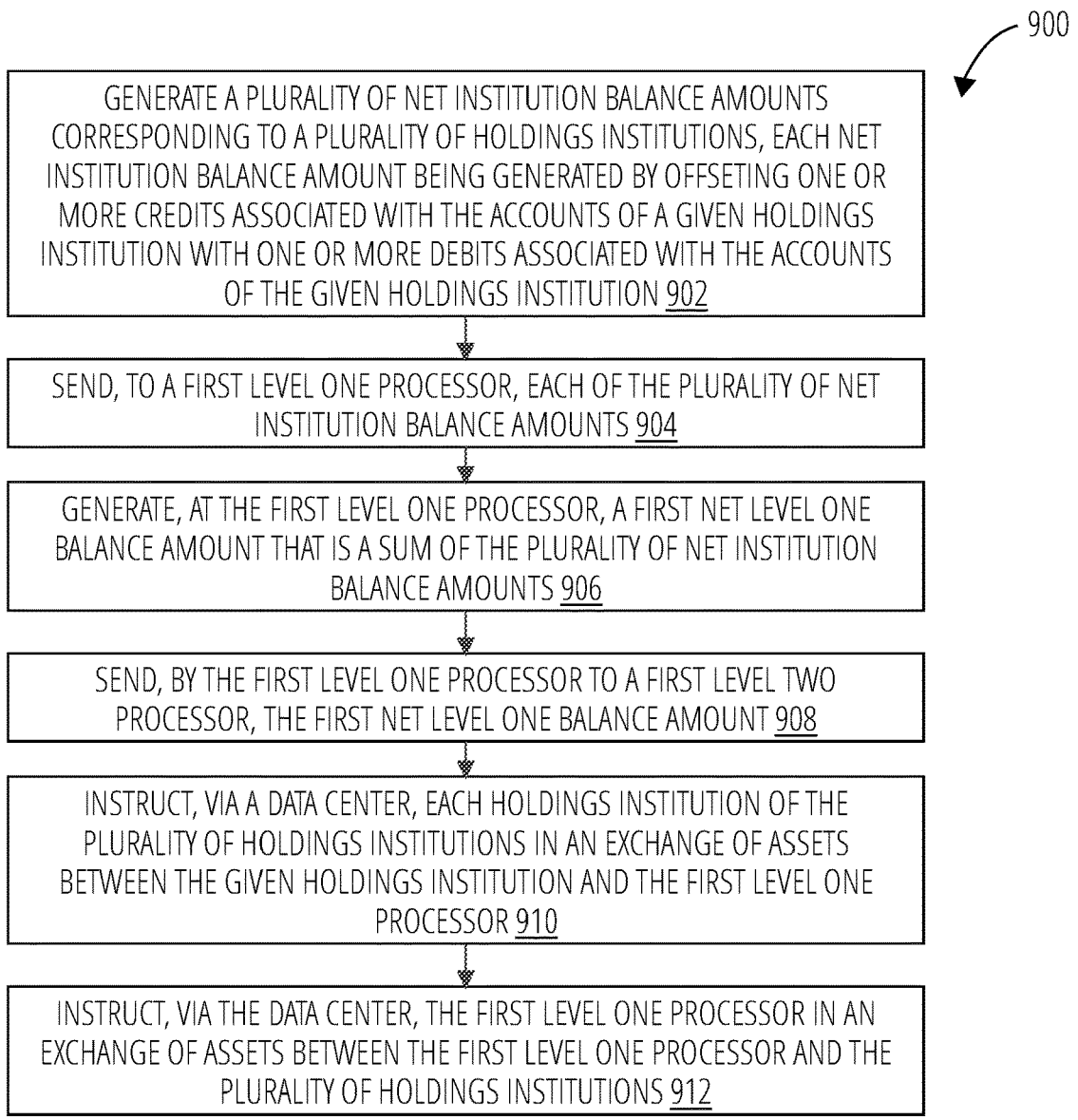
FIG. 9 illustrates a method of a system according to embodiments disclosed herein.

FIG. 9 illustrates a method 900 of a system according to embodiments disclosed herein. The method 900 includes generating 902, a plurality of net institution balance amounts corresponding to a plurality of holdings institutions, each net institution balance amount being generated by offsetting one or more credits associated with the accounts of a given holdings institution with one or more debits associated with the accounts of the given holdings institution.

The method 900 includes sending 904, to a first level one processor, each of the plurality of net institution balance amounts.

The method 900 includes generating 906, at the first level one processor, a first net level one balance amount that is a sum of the plurality of net institution balance amounts.

The method 900 includes sending 908, by the first level one processor to a first level two processor, the first net level one balance amount.

The method 900 includes instructing 910, via a data center, each holdings institution of the plurality of holdings institutions in an exchange of assets between the given holdings institution and the first level one processor.

The method 900 includes instructing 912, via the data center, the first level one processor in an exchange of assets between the first level one processor and the plurality of holdings institutions.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Principles of the present disclosure may be reflected in a computer program product on a tangible computer-readable storage medium having stored instructions thereon that may be used to program a computer (or other electronic device) to perform processes described herein. Any suitable computer-readable storage medium may be utilized, including magnetic storage devices (hard disks, floppy disks, and the like), optical storage devices (CD-ROMs, DVDs, Blu-Ray discs, and the like), flash memory, and/or other types of medium/machine readable medium suitable for storing electronic instructions. These instructions may be loaded onto a general purpose computer, special purpose computer, or other programmable data processing apparatus to produce a machine, such that the instructions that execute on the computer or other programmable data processing apparatus create means for implementing the functions specified. These instructions may also be stored in a computer-readable memory that can direct a computer or other programmable data processing apparatus to function in a particular manner, such that the instructions stored in the computer-readable memory produce an article of manufacture including instruction means which implement the function specified. The instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, JavaScript, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and MacOS. Alternatively, it is expected that future embodiments will be adapted to execute on other future operating systems.

It will be obvious to those having skill in the art that many changes may be made to the details of the above-described embodiments without departing from the underlying principles of the invention. The scope of the present invention should, therefore, be determined only by the following claims.

The invention claimed is:

1. A system for reducing a number of asset transfers between holdings institutions in order to balance accounts, comprising:
   a first processor of a plurality of first processors;
   a second processor in communication with one or more of the plurality of processors, including the first processor;
   a third processor, in communication with one or more of the plurality first processors including the first processor, and second processor, wherein the first processor is a lowest level processor of a hierarchy of processors that includes the second processor that is above the first processor, and the third processor is above the second processor, in the hierarchy of processors;
   a plurality of holdings institutions each in communication with the first processor, each holdings institution having one or more accounts comprising assets;
   wherein the system is configured to generate a plurality of net institution balance amounts comprising a net institution balance amount for each of the plurality of holdings institutions by offsetting one or more credits associated with the accounts of a given holdings institution with one or more debits associated with the accounts of the given holdings institution, and;
   wherein the system is further configured to send the net institution balance amount for each of the plurality of holdings institutions to the first processor;
   wherein the second processor is configured to receive net balance amounts from the first processor and one or more additional net balance amounts from the one or more first processors, wherein the second processor is further configured to balance the net balance amounts and the one or more additional net balance amounts based at least on a comparison to generate a net second processor balance amount; and
   wherein the third processor is configured to receive a net second processor balance amount from the second processor, and wherein the third processor is further configured to perform balancing calculations on the net second processor balance amount.

2. The system of claim 1, wherein the first processor is further configured to receive assets from a first holdings institution of the plurality of holdings institutions equal to a positive net institution balance amount of the first holdings institution.

3. The system of claim 2, wherein the first processor is further configured to send assets to a second holdings institution of the plurality of holdings institutions equal to a negative net institution balance amount of the second holdings institution.

4. The system of claim 3, wherein at least some of the assets sent from the first processor to the second holdings institution are assets that were received at the first processor from the first holdings institution.

5. The system of claim 3, wherein the second holdings institution uses the assets received from the first processor to settle one or more credits for one or more accounts of the second holdings institution.

6. The system of claim 3, wherein the first processor is further configured to receive assets from flail the second processor, and wherein at least some of the assets received from the second processor at the first processor are sent by the first processor to the second holdings institution.

7. The system of claim 3, wherein the first processor is configured to send at least some of the assets received from the first holdings institution to flail the second processor.

8. The system of claim 3, wherein at least one of the transfers of assets between two of the first holdings institution, the second holdings institution, and the first processor is according to instructions received at the first processor from a data center comprising the third processor.

9. The system of claim 1, wherein the first processor is the lowest level processor of the hierarchy of processors that includes the second processor that is above the first processor in the hierarchy of processors.

10. The system of claim 1, wherein a credit associated with an account of a first holdings institution of the plurality of holdings institutions corresponds to a debit associated with an account of a holdings institution that is not in communication with the first processor.

11. The system of claim 1, wherein a credit associated with an account of the plurality of holdings institutions corresponds to an entitlement to receive an asset.

12. The system of claim 1, wherein a debit associated with an account of the plurality of holdings institutions corresponds to an obligation to disperse an asset from the account.

13. The system of claim 1, wherein an account of one of the plurality of holdings institutions corresponds to user account data that is stored in a data vault controlled by a data center comprising the third processor; and wherein instructions from the data center pertaining to the account include a representation corresponding to the user account data.

14. A system for reducing a number of asset transfers between holdings institutions in order to balance accounts, comprising:
   a hierarchy of processors comprising at least a level one level having a plurality of level one processors, a level two level having one or more level two processors, and a level three level having at least one level three processor, each level one processor in the hierarchy in communication with a level two processor in the hierarchy, and each level three processor in communication with a level two processor in the hierarchy and a level one processor in the hierarchy;

a plurality of holdings institutions each in communication with a first level one processor of the plurality of level one processors, each of the plurality of holdings institutions having one or more accounts comprising assets;

wherein the system is configured to generate a plurality of net institution balance amounts comprising a net institution balance amount for each of the plurality of holdings institutions by offsetting one or more credits associated with the accounts of a given holdings institution with one or more debits associated with the accounts of the given holdings institution;

wherein the first level one processor is configured to use each net institution balance amount to generate a first net level one balance amount that is a sum of the plurality of net institution balance amounts;

wherein a first level two processor of the one or more level two processors is configured to receive a plurality of net level one balance amounts comprising the first net level one balance amount from the first lower level processor and one or more additional net level one balance amounts from the remainder of the plurality of level one processors, and is further configured to generate a first net level two balance amount that is a sum of the plurality of net level one balance amounts;

wherein the level three processor is configured to receive the net level two balance amount from the first level two processor, and wherein the third processor is further configured to perform balancing calculations on the net level two balance amount.

15. The system of claim 14, wherein a data center comprising the level three processor is configured to receive the first net level two balance amount from the first level two level processor.

16. The system of claim 14, wherein the one or more level two processors comprise a plurality of level two processors.

17. The system of claim 16, wherein a data center comprising the level three processor is configured to receive a plurality of net level two balance amounts comprising the net first level two balance amount and one or more additional net level two balance amounts from the remainder of the plurality of level two processors.

18. The system of claim 17, wherein the level three processor is configured to receive a plurality of net level two balance amounts comprising the net first level two balance amount and one or more additional net level two balance amounts from the remainder of the plurality of higher processors.

19. The system of claim 14, wherein a data center comprising the level three processor is configured to instruct each given holdings institution of the plurality of holdings institutions in an exchange of assets between the given holdings institution and the first level one processor.

20. The system of claim 14, wherein a data center comprising the level three processor is configured to instruct the first level one processor in an exchange of assets between the first level one processor and the plurality of holdings institutions.

21. The system of claim 20, wherein the data center is configured further to instruct the first level one processor in an exchange of assets between the first level one processor and the first level two processor to balance the first net level one balance amount.

22. The system of claim 14, wherein a data center is configured to instruct the first level two processor in the exchange of assets between first level two processor and the plurality of level one processors.

23. The system of claim 22, wherein the data center is further configured to instruct the first level two processor in the exchange of assets between the first level two processor and the level three processor to balance the first net level two balance amount.

24. The system of claim 14, wherein at least one of the plurality of net institution balance amounts is generated by the holdings institution corresponding to the one net institution balance amount and is sent by the holdings institution corresponding to the one net institution balance amount to the first level one processor.

25. The system of claim 14, wherein at least one of the plurality of net institution balance amounts is generated by the first level one processor.

26. The system of claim 14, wherein at last one of the plurality of net institution balance amounts is generated by a data center comprising the level three processor and is sent by the data center to the first level one processor.

27. A method for reducing a number of asset transfers between holdings institutions in order to balance accounts, comprising:

generating a plurality of net institution balance amounts corresponding to a plurality of holdings institutions, each net institution balance amount being generated by offsetting one or more credits associated with the accounts of a given holdings institution with one or more debits associated with the accounts of the given holdings institution;

sending, to a first level one processor, each of the plurality of net institution balance amounts;

generating, at the first level one processor, a first net level one balance amount that is a sum of the plurality of net institution balance amounts;

sending, by the first level one processor to a first level two processor, the first net level one balance amount;

receiving, by the first level two processor from one or more other level one processors, one or more additional net level one balance amounts;

generating, by the first level two processor, a first net level two balance amount that is a sum of the first net level one balance amount and the one or more additional net level one balance amounts;

sending, by the first level two processor to a first level three processor, the first net level two balance amount; and performing, by the first level three processor, balancing calculations on the first net level two balance amount.

28. The method of claim 27, further comprising:

receiving, at the first level two processor, a plurality of net level one balance amounts including the first net level one balance amount; and calculating, at the first level two processor, a first net level two balance amount that is a sum of the plurality of net level one balance amounts.

29. The method of claim 27, wherein at least one of the plurality of net institution balance amounts is generated by the holdings institution corresponding to the at least one of the plurality of net institution balance amounts.

30. The method of claim 27, wherein at least one of the plurality of net institution balance amounts is generated by the first level one processor.

31. The method of claim 27, wherein at least one of the plurality of net institution balance amounts is generated by a data center comprising the level three processor.

32. The method of claim 27, further comprising:
instructing, via a data center comprising the level three processor, each holdings institution of the plurality of holdings institutions in an exchange of assets between the given holdings institution and the first level one processor; and
instructing, via the data center, the first level one processor in an exchange of assets between the first level one processor and the plurality of holdings institutions.

\* \* \* \* \*